US009595232B2

(12) United States Patent
Kaneko

(10) Patent No.: US 9,595,232 B2
(45) Date of Patent: Mar. 14, 2017

(54) LIQUID CRYSTAL DISPLAY DEVICE AND DRIVING METHOD THEREOF

(71) Applicant: Sharp Kabushiki Kaisha, Osaka-shi, Osaka (JP)

(72) Inventor: Seiji Kaneko, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 96 days.

(21) Appl. No.: 14/386,341

(22) PCT Filed: Apr. 5, 2013

(86) PCT No.: PCT/JP2013/060434
§ 371 (c)(1),
(2) Date: Sep. 19, 2014

(87) PCT Pub. No.: WO2013/154039
PCT Pub. Date: Oct. 17, 2013

(65) Prior Publication Data

US 2015/0049071 A1 Feb. 19, 2015

(30) Foreign Application Priority Data

Apr. 13, 2012 (JP) ................................ 2012-092312

(51) Int. Cl.
*G06F 3/038* (2013.01)
*G09G 5/00* (2006.01)
*G09G 3/36* (2006.01)

(52) U.S. Cl.
CPC ... *G09G 3/3648* (2013.01); *G09G 2300/0871* (2013.01); *G09G 2310/0251* (2013.01);
(Continued)

(58) Field of Classification Search
CPC ...... G02F 1/1368; G02F 2001/136231; G09G 2300/08; G09G 3/30
See application file for complete search history.

(56) References Cited

U.S. PATENT DOCUMENTS

2002/0196386 A1* 12/2002 Grace ..................... B32B 38/06 349/61
2003/0184538 A1* 10/2003 Yamato ................ G09G 3/3696 345/211

(Continued)

FOREIGN PATENT DOCUMENTS

CN 101354870 A 1/2009
JP 2001-183623 A 7/2001

(Continued)

OTHER PUBLICATIONS

Official Communication issued in International Patent Application No. PCT/JP2013/060434, mailed on May 7, 2013.

*Primary Examiner* — Alexander Eisen
*Assistant Examiner* — Nan-Ying Yang
(74) *Attorney, Agent, or Firm* — Keating & Bennett, LLP

(57) ABSTRACT

Provided are: a liquid crystal display device capable of rapidly discharging an image signal which is held in a pixel formation portion, when a power supply thereof is turned off; and a driving method of the liquid crystal display device. If the liquid crystal display device shifts to an off-sequence mode, then a data signal Vd with a potential Vdoff1 corresponding to a shift amount ΔV3 lowered by a coupling effect of a parasitic capacitance formed between a gate terminal and drain terminal of a thin film transistor (12) is applied to a signal line SL. When a scanning signal Vg turns to a high level, the data signal Vd applied to the signal line SL is written into the pixel formation portion (11), and a potential of a pixel signal Vpix becomes the Vdoff1. When the scanning signal Vg falls to a ground potential GND after an elapse of a period t1, the potential of the pixel signal Vpix is lowered by a shift amount ΔV3, and accordingly, the potential of the pixel signal Vpix becomes the ground (Continued)

potential GND. In this way, a direct current voltage applied to the liquid crystal layer also becomes 0V.

11 Claims, 7 Drawing Sheets

(52) U.S. Cl.
CPC ............... *G09G 2310/0289* (2013.01); *G09G 2310/061* (2013.01); *G09G 2320/0204* (2013.01); *G09G 2320/0247* (2013.01); *G09G 2320/0257* (2013.01); *G09G 2330/022* (2013.01); *G09G 2330/027* (2013.01)

(56) References Cited

U.S. PATENT DOCUMENTS

| | | | | |
|---|---|---|---|---|
| 2006/0012552 | A1 | 1/2006 | Chiu et al. | |
| 2007/0194379 | A1 | 8/2007 | Hosono et al. | |
| 2008/0225027 | A1* | 9/2008 | Toyomura | G09G 3/3233 345/204 |
| 2011/0233537 | A1 | 9/2011 | Shu et al. | |

FOREIGN PATENT DOCUMENTS

| | | | |
|---|---|---|---|
| JP | 2003-050565 | A | 2/2003 |
| JP | 2005-250034 | A | 9/2005 |
| JP | 2011-085680 | A | 4/2011 |
| TW | 200604979 | A | 2/2006 |
| TW | I253037 | B | 4/2006 |
| TW | 201133857 | A1 | 10/2011 |
| WO | 2005/088726 | A1 | 9/2005 |

* cited by examiner

LIQUID CRYSTAL DISPLAY DEVICE AND DRIVING METHOD THEREOF

TECHNICAL FIELD

The present invention relates to a liquid crystal display device and a driving method thereof, and particularly, relates to an active matrix-type liquid crystal display device that shifts to an off-sequence mode in such a manner that a power supply is turned off, and to a driving method thereof.

BACKGROUND ART

On a display unit of an active matrix-type liquid crystal display device, a plurality of pixel formation portions are arranged in a matrix. On the respective pixel formation portions, thin film transistors (hereinafter, referred to as "TFTs") which operate as switching elements are provided. By switching on/off the TFTs, driving image signals (hereinafter, referred to as "image signals") for displaying an image are written into the pixel formation portions. The image signals are applied to liquid crystal layers of the pixel formation portions, and change orientation directions of liquid crystal molecules to directions corresponding to voltage values of the image signals. In such a manner as described above, the liquid crystal display device controls light transmittance of the liquid crystal layer of each of the pixel formation portions, and thereby displays the image on the display unit.

In the liquid crystal display device as described above, if a power supply of the liquid crystal display device is turned off when the image is displayed on the display unit, then each of the TFTs also turns to an off state. The image signal which is held in the pixel formation portion when the power supply is turned off is held in a state where a potential thereof is maintained, and accordingly, a direct current voltage continues to be applied to the liquid crystal layer of the pixel formation portion even after the power supply is turned off.

However, in a TFT having a channel layer made of amorphous silicon (a-Si) or continuous grain silicon (CGS silicon), an off-leak current that flows at a time of the off state is relatively large. Therefore, in a short time after the power supply is turned off, the image signal held in the pixel formation portion is discharged to a signal line through the channel layer of the TFT. In this way, an afterimage owing to image persistence of liquid crystal, which is caused by the fact that the direct current voltage continues to be applied, is less likely to occur.

In recent years, a TFT using an oxide semiconductor, which has larger mobility than the amorphous silicon and the continuous grain silicon and contains indium, gallium, zinc and oxygen, for the channel layer (hereinafter, this TFT is referred to as an "IGZO-TFT") has attracted attention, and development thereof has been conducted actively. In the IGZO-TFT, an off-leak current thereof is as extremely small as 1/1000 or less in comparison with that of a TFT using the amorphous silicon (hereinafter, referred to as an "a-Si TFT"). Accordingly, in a liquid crystal display device using the IGZO-TFT as the switching element, the image signal which is held in the pixel formation portion when the power supply is turned off continues to be held in the pixel formation portion for a long time, whereby the direct current continues to be applied to the liquid crystal layer. In this way, there occur such problems that the afterimage owing to the image persistence of the liquid crystal is generated, and that a flicker owing to deviation of an optimum common voltage is generated.

For example, in Japanese Patent Application Laid-Open No. 2011-85680, it is disclosed that voltages individually applied to a gate terminal, source terminal and common electrode of the TFT are controlled when the power supply of the liquid crystal display device is turned off, whereby the image signal held in the pixel formation portion is discharged.

PRIOR ART DOCUMENT

Patent Document

[Patent Document 1] Japanese Patent Application Laid-Open No. 2011-85680

SUMMARY OF THE INVENTION

Problems to be Solved by the Invention

However, the off-leak current of the IGZO-TFT is extremely small, and accordingly, in a driving method by the off-sequence mode, which is described in Japanese Patent Application Laid-Open No. 2011-85680, it takes a long time from when the power supply of the liquid crystal display device is turned off to when the image signal held in the pixel formation portion is completely discharged, and for this while, the direct current voltage continues to be applied to the liquid crystal layer. Therefore, in the driving method by the off-sequence mode, which is described in Japanese Patent Application Laid-Open No. 2011-85680, the afterimage owing to the image persistence of the liquid crystal and the flicker owing to the deviation of the optimum common voltage cannot be prevented sufficiently.

Therefore, an objective of the present invention is to provide a liquid crystal display device capable of rapidly discharging the image signal which is held in the pixel formation portion when the power supply of the liquid crystal display device itself is turned off, and to provide a driving method of the liquid crystal display device.

Means for Solving the Problems

According to a first aspect of the present invention, there is provided an active matrix-type liquid crystal display device that shifts to an off-sequence mode in such a manner that a power supply of the liquid crystal display device itself is turned off when the liquid crystal display device displays an image in an on-sequence mode, including: a display unit including a plurality of scanning lines, a plurality of signal lines which intersect the plurality of scanning lines, and pixel formation portions arranged in a matrix so as to individually correspond to intersections of the plurality of scanning lines and the plurality of signal lines, and having thin film transistors which turn to an on state or an off state in response to a level of scanning signals applied to the scanning lines corresponding to the pixel formation portions, and pixel capacitances which hold image signals representing an image to be displayed; a scanning line drive circuit that applies the scanning signals to the scanning lines, the scanning signals serving for selectively activating the plurality of scanning lines; a signal line drive circuit that applies the image signals to the signal lines; a display control circuit that individually outputs control signals necessary to generate the scanning signals and the image signals to the scanning line drive circuit and the signal line drive circuit; a common electrode drive circuit that is provided commonly to the plurality of pixel formation portions, and applies a common voltage to a common electrode serving as one-side electrodes of the pixel capacitances; and an off-sequence control circuit that outputs a signal to the display control circuit when the power supply of the liquid crystal display device is turned off, the signal being necessary for the liquid crystal display device to shift to the off-sequence mode, wherein the off-sequence control circuit: by the scanning line drive circuit, applies a scanning signal with a second level as a ground potential to each of the scanning lines after applying the scanning signal to each of the scanning lines a scanning signal with a first level for a predetermined period, the first level being necessary to turn the thin film transistor to the on state; by the signal line dive circuit, applies to each of the signal lines a data signal with a potential corresponding to a shift amount of each of the image signals for the predetermined period, the shift amount being determined by a level difference between the first level and the second level, a parasitic capacitance formed between a gate terminal and drain terminal of the thin film transistor and a synthetic capacitance of the pixel formation portion including the parasitic capacitance by turning the level of each of the scanning signals from the first level to the second level; and controls the display control circuit to apply the ground potential to the common electrode by the common electrode drive circuit.

According to a second aspect of the present invention, in the first aspect of the present invention, wherein the first level of the scanning signal is a level between a level necessary to turn the thin film transistor to the on state in the on-sequence mode and the ground potential.

According to a third aspect of the present invention, in the first aspect of the present invention, wherein the first level of the scanning signal is a plurality of levels set in a level order between a level necessary to turn the thin film transistor to the on state in the on-sequence mode and the ground potential, and the data signal at a time of an off sequence is a signal with a level determined by a level difference between a level most approximate to the ground potential among the plurality of levels and the ground potential, the parasitic capacitance formed between the gate terminal and drain terminal of the thin film transistor and the synthetic capacitance of the pixel formation portion including the parasitic capacitance.

According to a fourth aspect of the present invention, in the second or third aspect of the present invention, wherein the predetermined period of applying the scanning signal with the first level is a longer period as an on current of the thin film transistor is smaller when the scanning signal with the first level is applied to the gate terminal of the thin film transistor.

According to a fifth aspect of the present invention, in the first aspect of the present invention, wherein the first level of the scanning signal is a same level as a level necessary to turn the thin film transistor to the on state in the on-sequence mode.

According to a sixth aspect of the present invention, in the first aspect of the present invention, wherein the off-sequence control circuit includes a memory that stores a signal necessary for the liquid crystal display device to shift to the off-sequence mode, reads out the signal necessary for the liquid crystal display device to shift to the off-sequence mode from the memory when the liquid crystal display device shifts to the off-sequence mode, and outputs the read signal to the display control circuit.

According to a seventh aspect of the present invention, in the first aspect of the present invention, wherein a channel layer of the thin film transistor is formed of an oxide semiconductor.

According to an eighth aspect of the present invention, in the seventh aspect of the present invention, wherein the oxide semiconductor contains indium, gallium, zinc, and oxygen.

According to a ninth aspect of the present invention, there is provided a driving method of an active matrix-type liquid crystal display device that shifts to an off-sequence mode in such a manner that a power supply of the liquid crystal display device is turned off when the liquid crystal display device displays an image in an on-sequence mode, including a display unit including a plurality of scanning lines, a plurality of signal lines which intersect the plurality of scanning lines, and pixel formation portions arranged in a matrix so as to individually correspond to intersections of the plurality of scanning lines and the plurality of signal lines, and having thin film transistors which turn to an on state or an off state in response to a level of scanning signals applied to the scanning lines corresponding to the pixel formation portions, and pixel capacitances which hold image signals representing an image to be displayed; a scanning line drive circuit that applies the scanning signals to the scanning lines, the scanning signals serving for selectively activating the plurality of scanning lines; a signal line drive circuit that applies the image signals to the signal lines; a display control circuit that individually outputs control signals necessary to generate the scanning signals and the image signals to the scanning line drive circuit and the signal line drive circuit; a common electrode drive circuit that is provided commonly to the plurality of pixel formation portions, and applies a common voltage to a common electrode serving as one-side electrodes of the pixel capacitances; and an off-sequence control circuit that outputs a signal to the display control circuit when the power supply of the liquid crystal display device is turned off, the signal being necessary for the liquid crystal display device to shift to the off-sequence mode, the driving method including: a step of, by the scanning line drive circuit, applying a scanning signal with a second level as a ground potential to each of the scanning lines after applying the scanning signal to each of the scanning lines a scanning signal with a first level for a predetermined period, the first level being necessary to turn the thin film transistor to the on state; a step of, by the signal line dive circuit, applying a data signal with a potential corresponding to a shift amount of each of the image signals to each of the signal lines for the predetermined period, the shift amount being determined by a level difference between the first level and the second level, a parasitic capacitance formed between a gate terminal and drain terminal of the thin film transistor and a synthetic capacitance of the pixel formation portion including the parasitic capacitance by turning the level of each of the scanning signals from the first level to the second level; and a step of applying the ground potential to the common electrode by the common electrode drive circuit.

Effects of the Invention

In accordance with the first aspect, when the off-sequence control circuit applies the scanning signal with the first level by the fact that the liquid crystal display device shifts to the off-sequence mode, the off-sequence control circuit supplies to each of the signal lines the data signal with the potential corresponding to the shift amount of each of the image signals, the shift amount being determined by the level difference between the first level and the second level, the parasitic capacitance formed between the gate terminal and drain terminal of the thin film transistor, and the synthetic capacitance of the pixel formation portion including the parasitic capacitance. In this way, the data signal supplied to the signal line is written into the pixel formation portion. Next, the scanning signal is turned to the ground potential, whereby the potential of the written data signal is shifted and cancelled owing to a coupling effect by the parasitic capacitance. As a result, a voltage applied to the liquid crystal layer of the pixel formation portion becomes 0V, and accordingly, the afterimage owing to the image persistence of the liquid crystal and the flicker owing to the deviation of the optimum common voltage can be prevented from occurring.

In accordance with the second aspect, the first level of the scanning signal is set at the level between the level necessary to turn the thin film transistor to the on state in the on-sequence mode and the ground potential. In this way, even in a case where a capacitance value of the liquid crystal capacitance is varied because of process variations of the liquid crystal panel, the first level of the scanning signal is reduced, whereby the potential of the data signal at the time of the off sequence can be set at a value more approximate to the ground potential. Therefore, it becomes unnecessary to set different values as the potential of the data signal for each of the liquid crystal panels, and accordingly, it becomes easy to set the potential of the data signal. Moreover, an amount of electric charges accumulated in the pixel capacitance is further reduced, and accordingly, the direct current voltage applied to the liquid crystal layer can be set at 0V in a short time by leakage through the liquid crystal layer and the thin film transistor.

In accordance with the third aspect, the first level of the scanning signal is set at the plurality of levels set in a level order, and the scanning signals different in level at the time of the off sequence can be applied to the scanning line in a level order. In this way, the data signal at the time of the off sequence, which is supplied to the signal line, can be surely written into the pixel formation portion. Therefore, when the scanning signal with the ground potential is applied, the direct current voltage applied to the liquid crystal layer can be surely set at 0V.

In accordance with the fourth aspect, when the scanning signal with the first level of the scanning signal in the off sequence mode is applied to the gate terminal of the thin film transistor, a predetermined period for applying the scanning signal with the first level to the scanning line is lengthened as the on current is smaller. In this way, the data signal at the time of the off sequence, which is supplied to the signal line, can be surely written into the pixel formation portion.

In accordance with the fifth aspect, the first level of the scanning signal at the time of the off sequence is the same level as the level necessary to turn the thin film transistor to the on state in the on-sequence mode. In this way, the value of the voltage applied to the gate terminal of the thin film transistor becomes high, and the on current is increased.

Therefore, the data signal supplied to the signal line at the time of the off-sequence mode can be written into the pixel formation portion in a short time, and accordingly, a time until the direct current voltage applied to the liquid crystal layer is set at 0V can be shortened.

In accordance with the sixth aspect, the signal necessary for the liquid crystal display device to shift to the off sequence is pre stored in the memory of the off-sequence control circuit, whereby the shift to the off-sequence mode can be rapidly performed.

In accordance with the seventh aspect, while the off-leak current of the thin film transistor having the channel layer formed of the oxide semiconductor is extremely small, the direct current voltage applied to the liquid crystal layer in the off-sequence mode can be set at 0V even in a case of using the thin film transistor as described above as the switching element of the pixel formation portion.

In accordance with the eighth aspect, the oxide semiconductor is an oxide semiconductor containing indium, gallium, zinc and oxygen, and accordingly, in a similar way to the seventh aspect, the direct current voltage applied to the liquid crystal layer in the off-sequence mode can be set at 0V.

In accordance with the ninth aspect, similar effects to those of the above-described first aspect can be exerted.

MODES FOR CARRYING OUT THE INVENTION

<1. Basic Study >

Figure 1:
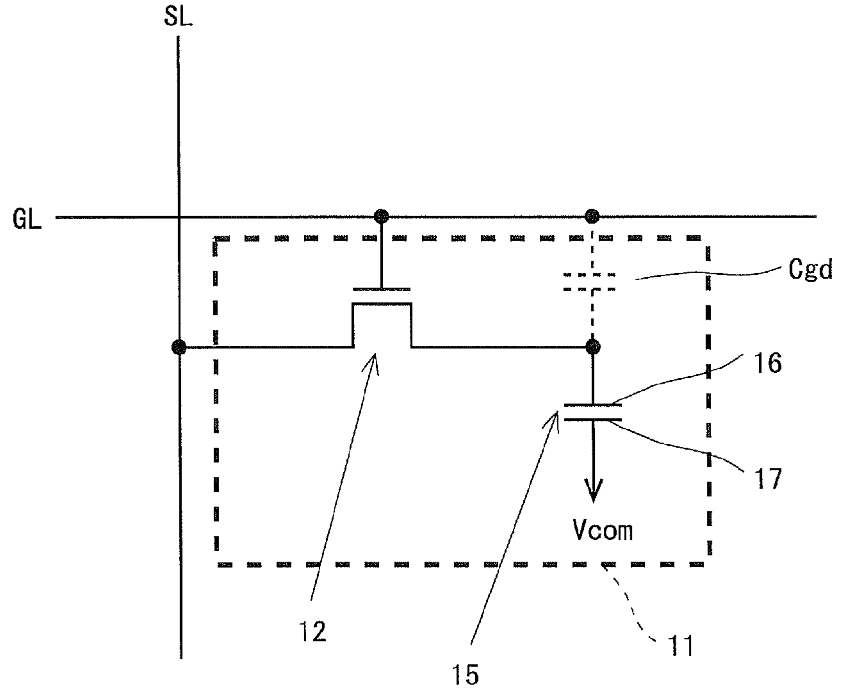
FIG. 1 is a circuit diagram showing an equivalent circuit of a pixel formation portion formed on a display unit of a liquid crystal display device used in a basic study.

FIG. 1 is a circuit diagram showing an equivalent circuit of a pixel formation portion 11 formed on a display unit of a liquid crystal display device for use in a basic study. As shown in FIG. 1, the pixel formation portion 11 includes: a TFT 12 that functions as a switching element; and a liquid crystal capacitance 15 charged with an image signal. The liquid crystal capacitance 15 is composed of: a pixel electrode 16; a common electrode 17 opposite to the pixel electrode 16; and a liquid crystal layer (not shown) arranged therebetween. The pixel electrode 16 is connected to a drain terminal of the TFT 12, and the common electrode 17 is connected to a common electrode drive circuit (not shown). Light transmittance of a backlight unit (not shown) in the pixel formation portion 11 is changed in response to the image signal given to the liquid crystal capacitance 15 in the pixel formation portion 11. Note that, frequently, an auxiliary capacitance is arranged in parallel to the liquid crystal capacitance 15 so that the pixel formation portion 11 can surely hold the image signal. However, the auxiliary capacitance is not directly concerned with the present invention, and accordingly, in this specification, a description is made on the assumption that the auxiliary capacitance is not provided.

A gate terminal of the TFT 12 is connected to a scanning line GL, and a source terminal thereof is connected to a signal line SL. The TFT 12 is, for example, an n-channel type TFT, turns to an on state when a high-level scanning signal is applied to the scanning line GL, and turns to an off state when a low-level scanning signal is applied thereto. Note that, in order to surely switch off the TFT, a potential equivalent to a low level of the scanning signal is set at a negative potential Vgl lower than a ground potential GND. Moreover, a parasitic capacitance Cgd is formed between the gate terminal and the drain terminal.

Figure 2:
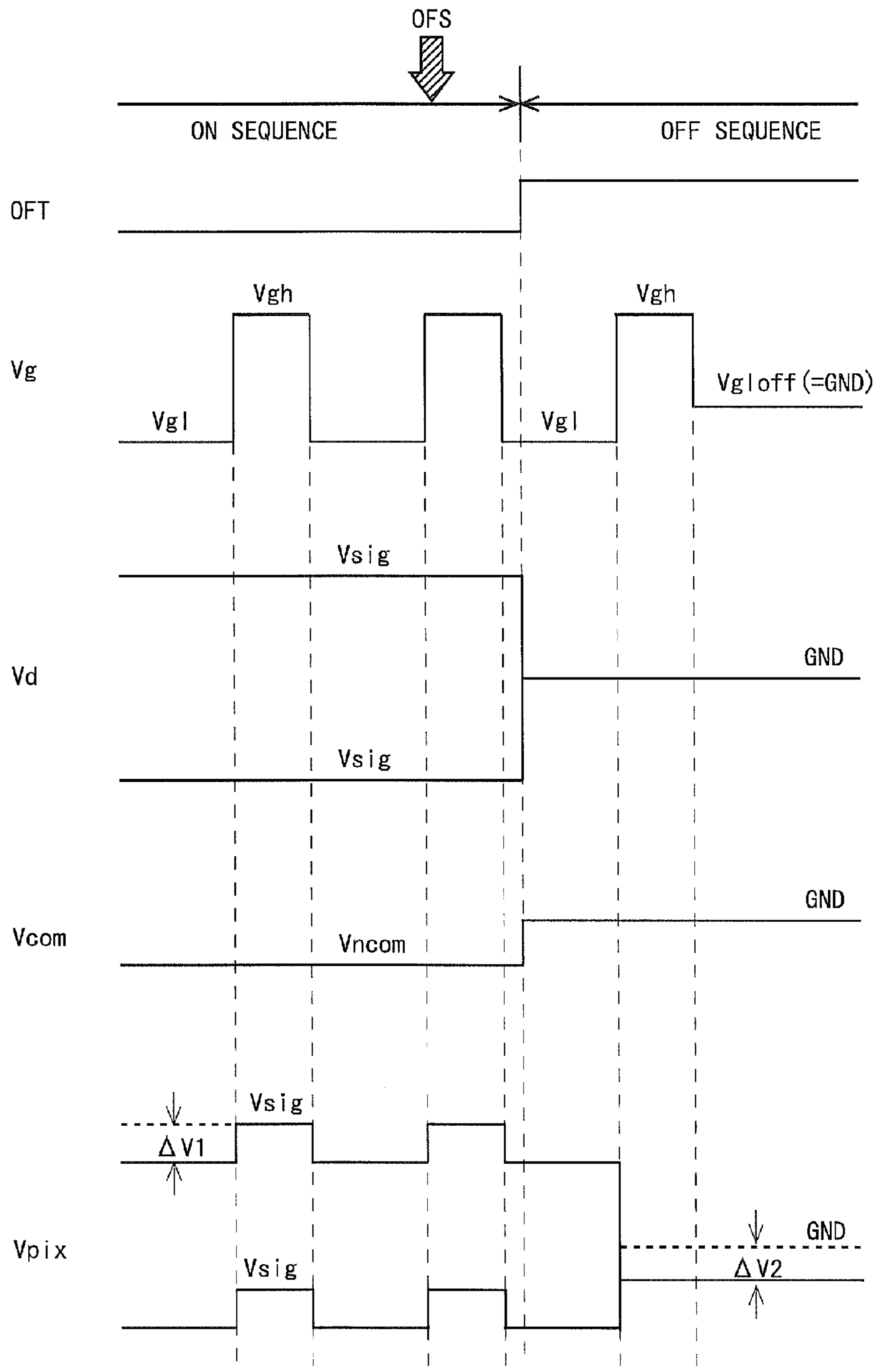
FIG. 2 is a timing chart showing operations of the pixel formation portion shown in FIG. 1.

FIG. 2 is a timing chart showing operations of the pixel formation portion 11 shown in FIG. 1. As shown in FIG. 2, when the liquid crystal display device operates in a mode of displaying an image on the display unit (hereinafter, this mode is referred to as an "on-sequence mode"), when a scanning signal Vg with a potential Vgh equivalent to a high level is applied to the scanning line GL, the TFT 12 turns to the on state, and the pixel formation portion 11 writes therein a data signal Vd that is an image signal with a potential Vsig, which is supplied to the signal line SL. The written data signal Vd is charged to the liquid crystal capacitance 15, and a direct current voltage corresponding to the potential Vsig of the data signal Vd is applied to the liquid crystal layer. Note that a potential of the pixel electrode 16 that composes the liquid crystal capacitance refers to a signal Vpix of the pixel formation portion 11 (hereinafter, this signal Vpix is referred to as a "pixel signal Vpix"), and becomes the same value as the potential Vsig of the data signal Vd when the TFT 12 is in the on state.

When the scanning signal Vg falls from the high level to the low level, the TFT 12 turns to the off state. It is known that, at this time, a potential of the pixel signal Vpix becomes smaller than the potential Vsig of the data signal Vd by a shift amount ΔV1 owing to a coupling effect of the parasitic capacitance Cgd. This shift amount ΔV1 is represented by the following Expression (1).

$$\Delta V1 = Cgd\cdot(Vgh-Vgl)/Ct \qquad (1)$$

Here, in the above-described Expression (1), a synthetic capacitance Ct represents a synthetic capacity of the liquid crystal capacitance 15 and the parasitic capacitance Cgd. Note that, in a case where the auxiliary capacitance is also provided, the synthetic capacitance Ct represents a synthetic capacitance of the liquid crystal capacitance 15, the parasitic capacitance Cgd and the auxiliary capacitance. In a case where a parasitic capacitance further including the pixel electrode 16 is present in the pixel formation portion 11, the synthetic capacitance Ct represents a capacitance added also with that parasitic capacitance.

A case where a power supply is turned off when the liquid crystal display device operates in the on-sequence mode is described. First, when the scanning signal Vg falls from the high level to the low level, the liquid crystal display device shifts to a mode of preventing the direct current voltage from being applied to the liquid crystal layer (hereinafter, this mode is referred to as an "off-sequence mode"). In the off-sequence mode, in place of the data signal Vd with the potential Vsig, a data signal Vd in which a potential is the ground potential GND is supplied to the signal line SL. In this state, if the TFT 12 is turned to the on state, then the data signal Vd is written into the pixel formation portion 11, and the potential of the pixel signal Vpix also becomes the ground potential GND. At this time, the ground potential GND is applied as a common voltage Vcom to the common electrode 17, and accordingly, the direct current voltage applied to the liquid crystal layer becomes 0V.

Next, when the scanning signal Vg falls from the high level to the low level, the TFT 12 turns to the off state, and a potential Vgloff equivalent to the low level of the scanning signal Vg becomes the ground potential GND. The potential of the pixel signal Vpix is lowered from the ground potential GND by a shift amount ΔV2 represented by the following Expression (2).

$$\Delta V2 = Cgd\cdot(Vgh-Vgl\mathrm{off})/Ct \qquad (2)$$

In this way, there occurs a problem that a direct current voltage corresponding to the shift amount ΔV2 continues to be applied to the liquid crystal layer arranged between the pixel electrode 16 and the common electrode 17.

Figure 3:
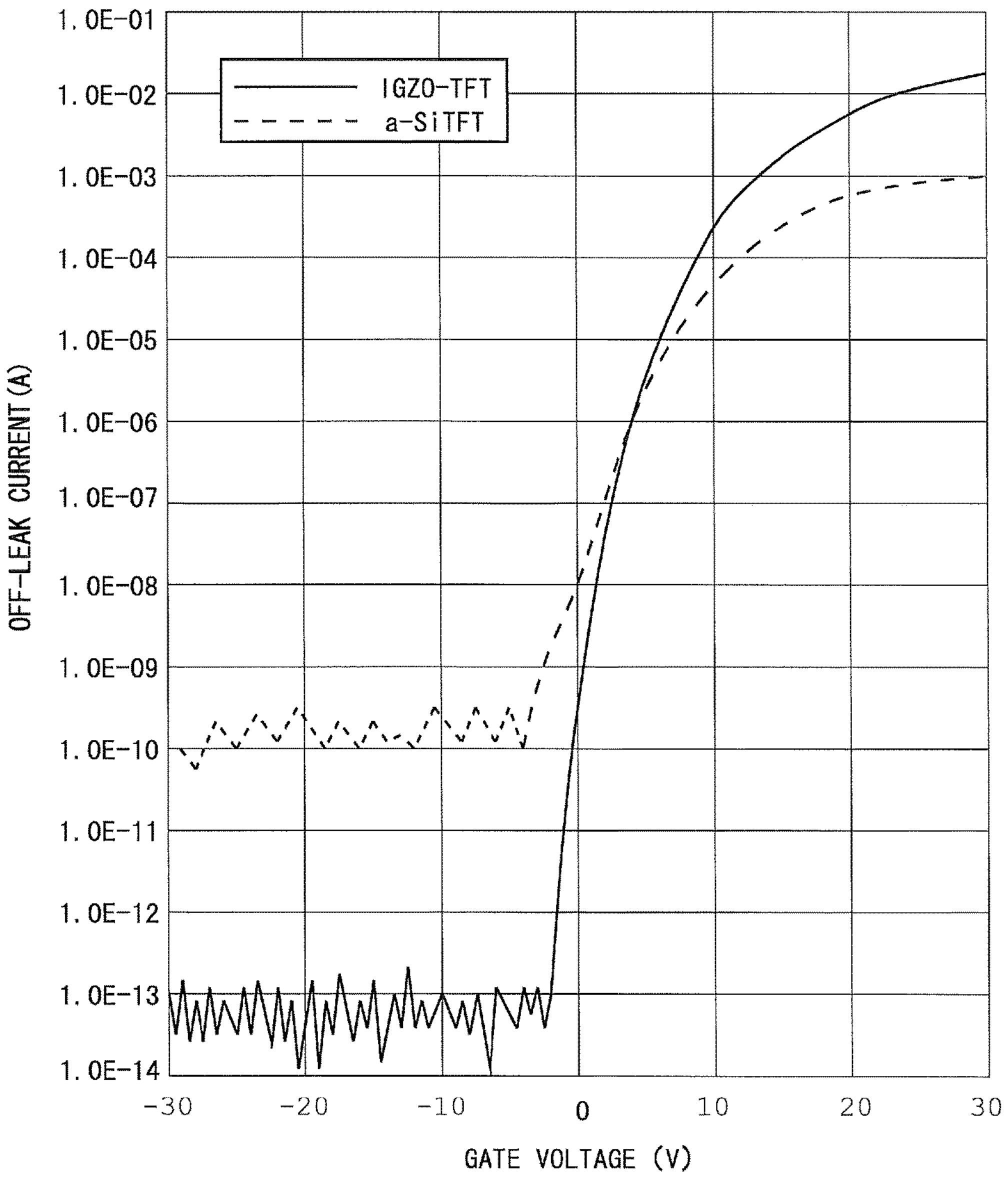
FIG. 3 is a graph comparing off-leak currents of an a-Si TFT and an IGZO-TFT with each other.

FIG. 3 is a graph comparing off-leak currents of an a-Si TFT and an IGZO-TFT with each other. As shown in FIG. 3, it is understood that the off-leak current of the IGZO-TFT is as extremely small as approximately 1/1000 in comparison with the off-leak current of the a-Si TFT. Therefore, in a case of using the IGZO-TFT as the switching element of the pixel formation portion 11, electric charges held in the pixel formation portion 11 when the IGZO-TFT turns to the off state are less likely to be discharged to the signal line SL through a channel layer of the IGZO-TFT, and a pixel signal Vpix with a potential (Vsig−ΔV2) continues to be held in the pixel formation portion 11 for a long time. In this way, there occurs a problem that a direct current voltage by the pixel signal Vpix continues to be applied to the liquid crystal layer for a long time.

Accordingly, a description is made below of a method for rapidly lowering the potential (Vsig−ΔV2) of the pixel signal Vpix to the ground potential GND in the off-sequence mode by using a phenomenon that the potential Vsig of the pixel signal Vpix is lowered by the shift amount ΔV2 that is determined by the above-described Expression (2) owing to the coupling effect of the parasitic capacitance Cgd even if the IGZO-TFT with such a small off-leak current is used as the switching element.

<2. First Embodiment>

<2.1 Configuration of Liquid Crystal Display Device>

Figure 4:
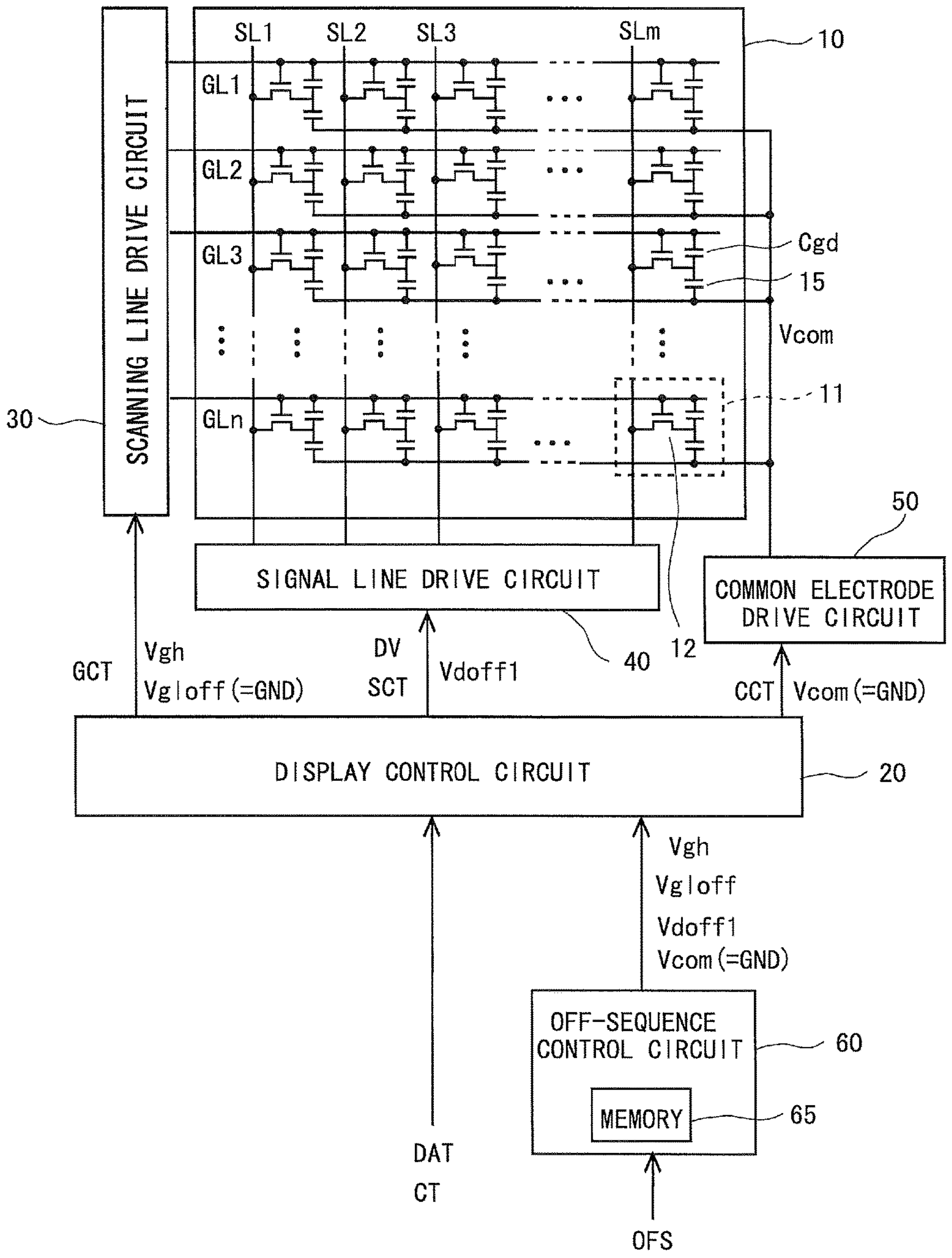
FIG. 4 is a block diagram showing a configuration of a liquid crystal display device according to a first embodiment of the present invention.

FIG. 4 is a block diagram showing a configuration of a liquid crystal display device according to a first embodiment of the present invention. As shown in FIG. 4, the liquid crystal display device includes: a display unit 10; a display control circuit 20; a scanning line drive circuit 30; a signal line drive circuit 40; a common electrode drive circuit 50; and an off-sequence control circuit 60. All of these units are formed on a liquid crystal panel (not shown) composed of an insulating substrate such as a glass substrate.

On the display unit 10, there are formed: a plurality (m) of signal lines SL1 to SLm; a plurality (n) of scanning lines GL1 to GLn; and a plurality (m×n) of pixel formation portions 11 provided so as to correspond to intersections of the m signal lines SL1 to SLm and the n scanning lines GL1 to GLn. Hereinafter, in a case where the m signal lines SL1 to SLm are not distinguished from one another, these are simply referred to as "signal lines SL", and in a case where the n scanning lines GL1 to GLn are not distinguished from one another, these are simply referred to as "scanning lines GL". The m×n of pixel formation portion 11 are arranged in a matrix.

A configuration of each of the pixel formation portions 11 is the same as the configuration of the pixel formation portion 11 shown in FIG. 1. Each of the pixel formation portion 11 is composed of : a TFT 12 in which a gate terminal is connected to the scanning line GL that passes through the intersection corresponding thereto, and in addition, a source terminal is connected to the signal line SL that passes through that intersection; a pixel electrode 16 connected to a drain terminal of the TFT 12; a common electrode 17 provided commonly to the m×n pixel formation portions 11; and a liquid crystal layer (not shown) arranged between the pixel electrode 16 and the common electrode 17, and arranged commonly to a plurality of the pixel formation portions 11. Among these constituent elements, the pixel electrode 16, the common electrode 17 and the liquid crystal layer compose the liquid crystal capacitance 15. For the purpose of surely holding the data signal in the pixel formation portion 11, an auxiliary capacitance may be provided in parallel to the liquid crystal capacitance 15. However, in this specification, the description is made on the assumption that the auxiliary capacitance is not provided. Note that capacitances such as the liquid crystal capacitances 15 formed on the pixel formation portions 11 and the auxiliary capacitances are sometimes collectively referred to as pixel capacitances.

For the TFT 12 of this embodiment, a TFT in which an oxide semiconductor is used for the channel layer is used. Specifically, the channel layer of the TFT 12 is formed of an oxide semiconductor containing indium (In), gallium (Ga), zinc (Zn) and oxygen (O). As shown in FIG. 3, in the IGZO-TFT, the off-leak current is reduced to a larger extent in comparison with the a-Si TFT. Note that an oxide semiconductor other than the IGZO may be, for example, an oxide semiconductor containing at least one of indium, gallium, zinc, copper (Cu), silicon (Si), tin (Sn), aluminum (Al), calcium (Ca), germanium (Ge), and lead (Pb). Moreover, the channel layer of the TFT 12 is not limited to the oxide semiconductor, and just needs to be formed of a material that diminishes the off-leak current.

In this embodiment, the description is made on the assumption that the TFT 12 is an n-channel type TFT which turns to the on state when a high-level scanning signal is applied to the gate terminal, and turns to the off state when a low-level scanning signal is applied thereto. However, the TFT 12 may be a p-channel type TFT which turns to the on state when the low-level scanning signal is applied to the gate terminal, and turns to the off state when the high-level scanning signal is applied thereto.

Next, operations of the respective circuits at a time of the on-sequence mode are described. The display control circuit 20 receives image data DAT and control signals CT such as vertical synchronization signals Vsync and horizontal synchronization signals Hsync from an outside, and based on the image data DAT and the control signals CT, outputs digital image signals DV corresponding to RGB data, and signal line control signals SCT such as source start pulse signals, source clock signals and latch strobe signals to the signal line drive circuit 40. Based on the signal line control signals SCT, the signal line drive circuit 40 converts the digital image signals DV into analog signals by a shift register (not shown), a sampling latch circuit (not shown), and a D/A conversion circuit (not shown) and the like in an inside thereof, and thereby generates data signals (data signals at a time of an on sequence) which are image signals. The signal line drive circuit 40 supplies the generated data signals to the signal lines SL.

Moreover, the display control circuit 20 outputs scanning line control signals GCT such as gate clock signals and gate start pulse signals to the scanning line drive circuit 30. The scanning line drive circuit 30 applies the high-level and low-level scanning signals to the scanning lines GL in a predetermined cycle based on the scanning line control signals GCT. The display control circuit 20 outputs common electrode control signals CCT to the common electrode drive circuit 50, and the common electrode drive circuit 50 outputs to the common electrode 17 the common voltage Vcom in which a potential is negative. In this way, when the high-level scanning signals are applied to the scanning lines GL, the data signals written from the signal lines SL into the pixel formation portions 11 are held in the liquid crystal capacitances 15 of the pixel formation portions 11. In this way, the direct current voltages are applied to the liquid crystal layers of the liquid crystal capacitances 15, and an image corresponding to potentials of the data signals is displayed on the display unit 10.

Note that, in this embodiment, it is defined that a polarity of the common voltage Vcom in the respective frame periods is constant; however, the polarity may be inverted every frame period. Moreover, in this embodiment, it is defined that the polarity of the common voltage Vcom is negative; however, may be positive or the ground potential GND.

Next, operations of the respective circuits at a time of the off-sequence mode are described. When the power supply of the liquid crystal display device is turned off, an off signal OFS is given to the off-sequence control circuit 60. The off-sequence control circuit 60 has a memory 65 in an inside thereof. In a case where the off signal OFS is given to the off-sequence control circuit 60, the off-sequence control circuit 60 reads out a variety of signals prestored in the memory 65, and outputs those signals to the display control circuit 20 in accordance with shift timing to the off-sequence mode. Specifically, to the display control circuit 20, the off-sequence control circuit 60 outputs: the high-level (potential Vgh) scanning signals to be applied to the scanning lines GL; the low-level (Vgloff) scanning signals with the ground potential GND, which are to be applied to the scanning lines GL; data signals with a potential Vdoff1, which are to be supplied to the signal lines SL; and the common voltage Vcom in which the potential is the ground potential GND.

Note that the variety of signals are not prestored in the memory 65, but may be obtained by calculation in the off-sequence control circuit 60 when the off signal OFS is given, and moreover, may be given to the off-sequence control circuit 60 from the outside together with the off signal OFS. Moreover, the memory 65 may be provided not in the off-sequence control circuit 60 but in the display control circuit 20.

In the off-sequence mode, the display control circuit stops outputting the high-level (potential Vgh) and low-level (potential Vgl) scanning signals which are applied to the scanning lines GL at the time of the on-sequence mode, and outputs scanning signals with the potential Vgh corresponding to the high level (first level) and with the potential Vgloff corresponding to the low level (second level) to the scanning line drive circuit 30. As described above, the potential Vgh corresponding to the high level at the time of the off-sequence mode is the same value as the potential at the time of the on-sequence mode. However, the potential Vgloff corresponding to the low level is a higher value than the potential Vgl at the time of the on-sequence mode, and specifically, is the ground potential GND.

Moreover, the display control circuit 20 stops outputting digital image signals DV for generating the data signals which are outputted at the time of the on-sequence mode, and outputs to the signal line drive circuit 40 data signals with the potential Vdoff1, which are given from the off-sequence control circuit 60. Note that the potential Vdoff1 of the data signals is a constant value, and details thereof will be described later.

The signal line drive circuit 40 supplies the data signals with the potential Vdoff1 to the signal lines SL. The scanning line drive circuit 30 applies to the scanning lines GL during a period t1 the scanning signals with the potential Vgh corresponding to the high level, and next, applies to the scanning lines GL the scanning signals with the potential Vgloff corresponding to the low level. The common electrode drive circuit 50 applies to the common electrode 17 the common voltage Vcom in which the potential is the ground potential GND.

<2.2 Driving Method of Liquid Crystal Display Device>

Figure 5:
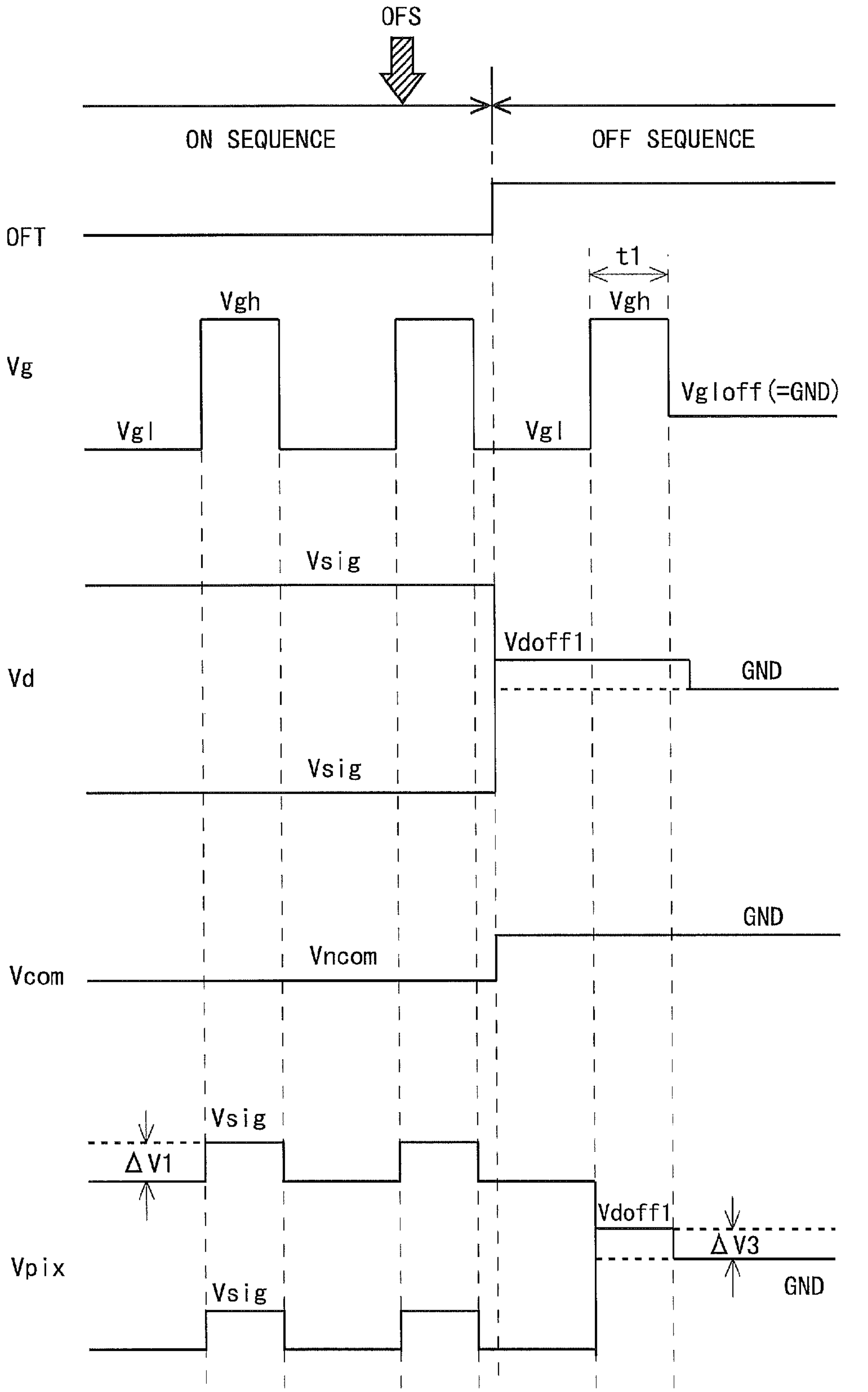
FIG. 5 is a timing chart showing a driving method of the liquid crystal display device shown in FIG. 4.

FIG. 5 is a timing chart showing a driving method of the liquid crystal display device according to this embodiment. FIG. 5 shows operations of the liquid crystal display device when the liquid crystal display device shifts to the off-sequence mode in such a manner that the power supply is turned off when the liquid crystal display device operates in the on-sequence mode.

First, operations of the liquid crystal display device in a period while the liquid crystal display device operates in the on-sequence mode are described. When the scanning signal Vg with the potential Vgh corresponding to the high level is applied to each of the scanning lines GL every frame period, the TFT 12 turns to the on state, and the data signal (image signal) Vd with the potential Vsig which represents the image supplied to the signal line SL is written. The written data signal Vd is charged to and held in the liquid crystal capacitance 15.

At this time, the TFT 12 is in the on state during such a period while the scanning signal Vg is at the high level, and accordingly, the potential of the pixel signal Vpix becomes the same potential as the potential Vsig of the data signal Vd. However, when the scanning signal Vg of the potential Vgl corresponding to the low level is applied to the scanning line GL, the TFT 12 turns to the off state, and owing to the coupling effect of the parasitic capacitance Cgd, the potential of the pixel signal Vpix becomes a value lowered from the potential of the data signal Vd by the shift amount ΔV1 shown in the above-described Expression (1). Moreover, a negative potential Vncom is given as the common voltage Vcom. In this way, in each of the pixel formation portions, a direct current voltage determined by the data signal Vd and the common voltage Vcom is applied to the liquid crystal layer arranged between the pixel electrode 16 and the common electrode 17, and the image is displayed. Note that a level of the data signal Vd is changed in response to the image to be displayed, and does not become a constant value unlike the level of the scanning signal Vg. Therefore, in FIG. 5, the level of the data signal Vd is represented as a level having some range.

When the liquid crystal display device operates in the on-sequence mode, if the power supply thereof is turned off, then an off-sequence mode shifting signal OFT rises when the scanning signal Vg falls from the high level to the low level for the first time after the off signal OFS is inputted to the off-sequence control circuit 60, and the liquid crystal display device shifts to the off-sequence mode.

By the fact that the liquid crystal display device shifts to the off-sequence mode, the signal line drive circuit 40 reads out the data signal Vd with the potential Vdoff1 (the data signal at the time of the off sequence), in place of the data signal Vd with the potential Vsig, the data signal Vd being obtained in advance based on the following Expression (3), and being stored in the memory 65 of the off-sequence control circuit 60, and then the signal line drive circuit 40 supplies the read data signal Vd to the signal line SL.

$$Vdoff1 = Cgd\cdot(Vgh - Vgloff)/Ct \quad (3)$$

Note that, in the above-described Expression (3), the potential corresponding to the low level of the scanning signal Vg at the time of the off sequence is defined to be Vgloff. Specifically, the potential Vgloff is the ground potential GND.

Moreover, the common electrode drive circuit 50 gives the ground potential GND as the common voltage Vcom in place of the negative potential Vncom.

Next, during the period t1, the scanning line drive circuit 30 applies the high-level scanning signal Vg with the same potential Vgh as that at the time of the on-sequence mode to the scanning line GL. In this way, the TFT 12 turns to the on state, the data signal Vd with the potential Vdoff1, which is supplied to the signal line SL, is written into the pixel formation portion 11, and the potential of the pixel signal Vpix also becomes the Vdoff1.

After the elapse of the period t1, the scanning signal Vg falls from the high level to the low level. At this time, the potential corresponding to the low level is set not at the Vgl at the time of the on sequence, but at the ground potential GND that is a higher potential than the Vgl. If the scanning signal Vg falls from the high level to the low level, then owing to the coupling effect of the parasitic capacitance Cgd, the potential Vdoff1 of the pixel signal Vpix is lowered by a shift amount ΔV3 shown in the following Expression (4).

$$\Delta V3 = Cgd\cdot(Vgh - Vgloff)/Ct \quad (4)$$

In this case, the shift amount ΔV3 from the potential Vdoff1 of the pixel signal Vpix when the TFT 12 is turned to the off state is equal to the Vdoff1 of the pixel signal Vpix written into the pixel formation portion 11 through the TFT 12 at such a shifting time to the off sequence, the Vdoff1 being represented by the above-described Expression (3). As a result, if the shift amount ΔV3 owing to the coupling effect of the parasitic capacitance Cgd is taken into consideration, then the potential Vpixoff of the pixel signal Vpix when the TFT 12 is turned to the off state becomes the ground potential GND in accordance with the following Expression (5).

$$Vpixoff = Vdoff1 - \Delta V3 = 0 \quad (5)$$

In this way, together with the common voltage Vcom of the common electrode 17, the potential Vpixoff of the pixel signal Vpix, which is the potential of the pixel electrode 16 of the liquid crystal capacitance 15, also becomes the ground potential GND, and accordingly, the direct current voltage applied to the liquid crystal layer arranged therebetween becomes 0V.

<2.3 Effects>

In accordance with this embodiment, when the power supply of the liquid crystal display device using the IGZO-TFT with a small off-leak current as the switching element of the pixel formation portion 11 is turned off, the potential of the pixel signal Vpix, which is the potential of the pixel electrode 16 of the liquid crystal capacitance 15, rapidly becomes the ground potential GND, and the direct current voltage applied to the liquid crystal layer arranged between the pixel electrode 16 and the common electrode 17 becomes 0V. In this way, the afterimage owing to the image persistence of the liquid crystal and the flicker owing to the deviation of the optimum common voltage can be prevented from occurring.

Moreover, the potential Vgh corresponding to the high level of the scanning signal Vg at the time of the off-sequence mode is high, and accordingly, a value of the voltage applied to the gate terminal of the TFT 12 also becomes high, and an on current of the TFT 12 becomes large. In this way, the data signal Vd with the potential Vdoff1, which is supplied to the signal line SL at the time of the off-sequence mode, can be written into the pixel formation portion 11 in a short time, and accordingly, the time until the direct current voltage applied to the liquid crystal layer is set at 0V can be shortened.

<3. Second Embodiment>

<3.1 Configuration of Liquid Crystal Display Device>

A configuration of a liquid crystal display device according to a second embodiment is the same as the configuration of the liquid crystal display device according to the first embodiment, and accordingly, a block diagram showing the configuration is omitted. Moreover, among constituent elements included in the liquid crystal display device according to this embodiment, those different from the constituent elements included in the liquid crystal display device according to the first embodiment are mainly described.

Operations of the respective circuits in the on-sequence mode are the same as those in the case of the first embodiment, and accordingly, a description thereof is omitted, and operations of the respective circuits in the off-sequence mode are described. In a case where the off signal OFS is given to the off-sequence control circuit 60, the off-sequence control circuit 60 reads out a variety of signals prestored in the memory 65, and outputs those signals to the display control circuit 20 in accordance with shift timing to the off-sequence mode. Specifically, to the display control circuit 20, the off-sequence control circuit 60 outputs: high-level and low-level scanning signals to be applied to the scanning lines GL; the data signals to be supplied to the signal lines SL; and the common voltage Vcom in which the potential is the ground potential GND.

In the off-sequence mode, the display control circuit stops outputting the high-level (potential Vgh) and low-level (potential Vgl) scanning signals which are applied to the scanning lines GL at the time of the on-sequence mode, and outputs to the scanning line drive circuit 30 a scanning signal with a potential Vghoff corresponding to a high level different from that at the time of the on sequence and a scanning signal with a potential Vgloff corresponding to a low level different from that at the time of the on sequence. Specifically, the potential Vghoff corresponding to the high level at the time of the off-sequence mode is a value lower than the potential Vgh at the time of the on-sequence mode, and the potential Vgloff corresponding to the low level is the ground potential GND that is a value higher than the potential Vgl at the time of the on-sequence mode.

Moreover, the display control circuit 20 stops outputting the digital image signals DV for generating the data signals at the time of the on-sequence mode, and outputs to the signal line drive circuit 40 data signals with a potential Vdoff2, which are given from the off-sequence control circuit 60. Note that the potential Vdoff2 of the data signals is a constant value, and details thereof will be described later.

The signal line drive circuit 40 supplies the data signals with the potential Vdoff2 to the signal lines SL. The scanning line drive circuit 30 applies to the scanning lines GL the scanning signals with the potential Vghoff corresponding to the high level, during a period longer than the period in the case of the first embodiment, and next, applies to the scanning lines GL the scanning signals with the potential Vgloff corresponding to the low level. The common electrode drive circuit 50 applies to the common electrode 17 the common voltage Vcom in which the potential is the ground potential GND.

<3.2 Driving Method of Liquid Crystal Display Device>

Figure 6:
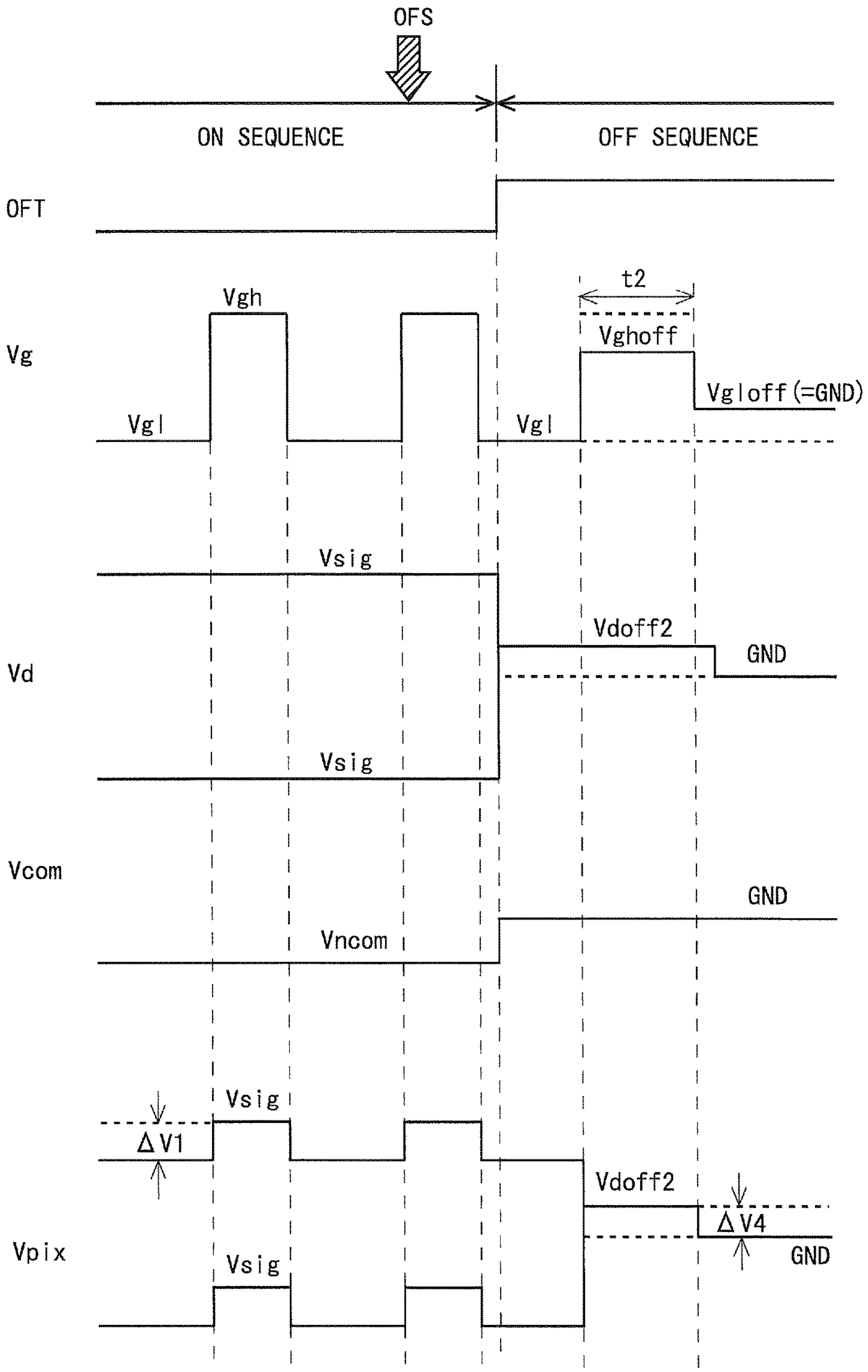
FIG. 6 is a timing chart showing a driving method of a liquid crystal display device according to a second embodiment of the present invention.

FIG. 6 is a timing chart showing a driving method of each of the pixel formation portions 11 included in the liquid crystal display device according to this embodiment. The timing chart shown in FIG. 6 shows a case where the liquid crystal display device shifts to the off-sequence mode in such a manner that the power supply is turned off when the liquid crystal display device operates in the on-sequence mode. Operations of the liquid crystal display device in the on-sequence mode are similar to those in the case of the on-sequence mode, which are described in the first embodiment, and accordingly, a description thereof is omitted.

When the liquid crystal display device operates in the on-sequence mode, if the power supply thereof is turned off, then an off-sequence mode shifting signal OFT rises when the scanning signal Vg falls from the high level to the low level for the first time after the off signal OFS is inputted to the off-sequence control circuit 60, and the liquid crystal display device shifts to the off-sequence mode.

By the fact that the liquid crystal display device shifts to the off-sequence mode, the signal line drive circuit 40 reads out the data signal Vd with the potential Vdoff2 (the data signal at the time of the off sequence), in place of the data signal Vd with the potential Vsig, the data signal Vd being obtained in advance based on the following Expression (6), and being stored in the memory 65 of the off-sequence control circuit 60, and then the signal line drive circuit 40 supplies the read data signal Vd to the signal line SL.

$$Vdoff2=Cgd\cdot(Vghoff-Vgloff)/Ct \quad (6)$$

Note that, in the above-described Expression (6), the potential corresponding to the high level of the scanning signal Vg at the time of the off sequence is defined to be Vghoff, and the potential corresponding to the low level thereof is defined to be Vgloff. Specifically, the potential Vgloff is the ground potential GND.

Moreover, the common electrode drive circuit 50 gives the ground potential GND as the common voltage Vcom in place of the negative potential Vncom.

Next, during a period t2 that is a period longer than the period t1 of the first embodiment, the scanning line drive circuit 30 applies the high-level scanning signal Vg to the scanning line GL. In this way, the TFT 12 turns to the on state, and the data signal Vd with the potential Vdoff2, which is supplied to the signal line SL, is written into the pixel formation portion 11, and the potential of the pixel signal Vpix also becomes the Vdoff2.

Here, a reason why the period of applying the high-level scanning signal Vg to the scanning line GL is lengthened is described. In this embodiment, the potential corresponding to the high level of the scanning signal Vg is reduced from the Vgh to the Vghoff, and accordingly, the gate voltage applied to the gate terminal of the TFT 12 also becomes low, and the on current of the TFT 12 becomes small. Accordingly, the time t2 while the high-level scanning signal Vg is applied is lengthened more than the time t1 in the case of the first embodiment, whereby it is made possible to surely write the data signal Vd with the potential Vdoff2, which is supplied to the signal line SL, into the pixel formation portion 11.

After the elapse of the period t2, the scanning signal Vg falls from the high level to the low level. At this time, the potential corresponding to the low level is set at the ground potential GND in a similar way to the case of the first embodiment. As described above, if the scanning signal Vg falls from the high level to the low level, then owing to the coupling effect of the parasitic capacitance Cgd, the potential Vdoff2 of the pixel signal Vpix is lowered by a shift amount ΔV4 shown in the following Expression (7).

$$\Delta V4 = Cgd \cdot (Vghoff - Vgloff)/Ct \quad (7)$$

In this case, the shift amount ΔV4 from the potential Vdoff2 of the pixel signal Vpix when the TFT 12 is turned to the off state becomes equal to the Vdoff2 of the pixel signal Vpix written into the pixel formation portion 11 through the TFT 12 at such a shifting time to the off sequence, the Vdoff2 being represented by the above-described Expression (6). As a result, when the TFT 12 is turned to the off state, if the shift amount ΔV4 owing to the coupling effect of the parasitic capacitance Cgd is taken into consideration, then the potential Vpixoff of the pixel signal Vpix becomes the ground potential GND in accordance with the following Expression (8).

$$Vpixoff = Vdoff2 - \Delta V4 = 0 \quad (8)$$

In this way, together with the common voltage Vcom of the common electrode 17, the potential Vdoff2 of the pixel signal Vpix, which is the potential of the pixel electrode 16 of the liquid crystal capacitance 15, also becomes the ground potential GND, and accordingly, the direct current voltage applied to the liquid crystal layer arranged therebetween becomes 0V.

<3.3 Effects>

In accordance with this embodiment, similar effects to those in the case of the first embodiment are obtained. Moreover, even in a case where a capacitance value of the liquid crystal capacitance 15 is varied because of process variations of the liquid crystal panel, the potential Vghoff corresponding to the high level of the scanning signal Vg is reduced, whereby the potential Vdoff2 of the data signal Vd supplied to the signal line SL at the time of the off sequence can be set at a value more approximate to the ground potential GND. In this way, it becomes unnecessary to set different values as the potential Vdoff2 of the data signal Vd for each of the liquid crystal panels, and accordingly, it becomes easy to set the potential Vdoff2 of the data signal Vd. Moreover, an amount of the electric charges accumulated in the liquid crystal capacitance 15 is further reduced, and accordingly, the direct current voltage applied to the liquid crystal layer can be set at 0V in a short time by the leakage through the liquid crystal layer and the TFT 12.

<4. Third Embodiment>

<4.1 Configuration of Liquid Crystal Display Device>

A configuration of a liquid crystal display device according to a third embodiment is the same as the configuration of the liquid crystal display device according to the first embodiment, and accordingly, a block diagram showing that configuration is omitted. Moreover, among constituent elements included in the liquid crystal display device according to this embodiment, those in which functions are different from those of the constituent elements included in the liquid crystal display device according to the first embodiment are mainly described.

Operations of the respective circuits in the on-sequence mode are the same as those in the case of the first embodiment, and accordingly, a description thereof is omitted, and operations of the respective circuits in the off-sequence mode are described. In a case where the off signal OFS is given to the off-sequence control circuit 60, the off-sequence control circuit 60 reads out a variety of signals prestored in the memory 65, and outputs those signals to the display control circuit 20 in accordance with shift timing to the off-sequence mode. Specifically, to the display control circuit 20, the off-sequence control circuit 60 outputs: high-level, intermediate level and low-level scanning signals to be applied to the scanning lines GL; data signals to be supplied to the signal lines SL; and the common voltage Vcom in which the potential is the ground potential GND.

In the off-sequence mode, the display control circuit stops outputting the high-level (potential Vgh) and low-level (potential Vgl) scanning signals which are applied to the scanning lines GL at the time of the on-sequence mode, and outputs to the scanning line drive circuit 30 a scanning signal with a potential Vgh corresponding to the high level, a scanning signal with a potential Vghoff corresponding to the intermediate level, and a scanning signal with a potential Vgloff corresponding to the low level. Here, the potential Vghoff corresponding to the intermediate level is a potential between the potential Vgh corresponding to the high level and the potential Vgloff corresponding to the low level.

Moreover, the display control circuit 20 stops outputting the digital image signals DV for generating the data signals at the time of the on-sequence mode, and outputs to the signal line drive circuit 40 data signals with a potential Vdoff3, which are given from the off-sequence control circuit 60. Note that the potential Vdoff3 of the data signals is a constant value, and details thereof will be described later.

The signal line drive circuit 40 supplies the data signals with the potential Vdoff3 to the signal lines SL. The scanning line drive circuit 30 applies to the scanning lines GL the scanning signals with the potential Vgh corresponding to the high level during a predetermined period. Next, the scanning line drive circuit 30 applies to the scanning lines GL the scanning signals with the potential Vghoff corresponding to the intermediate level during the predetermined period in a similar way. Then, the scanning line drive circuit 30 applies to the scanning lines GL the scanning signals with the potential Vgloff corresponding to the low level. The common electrode drive circuit 50 applies to the common electrode 17 the common voltage Vcom in which the potential is the ground potential GND.

<4.2 Driving Method of Liquid Crystal Display Device>

Figure 7:
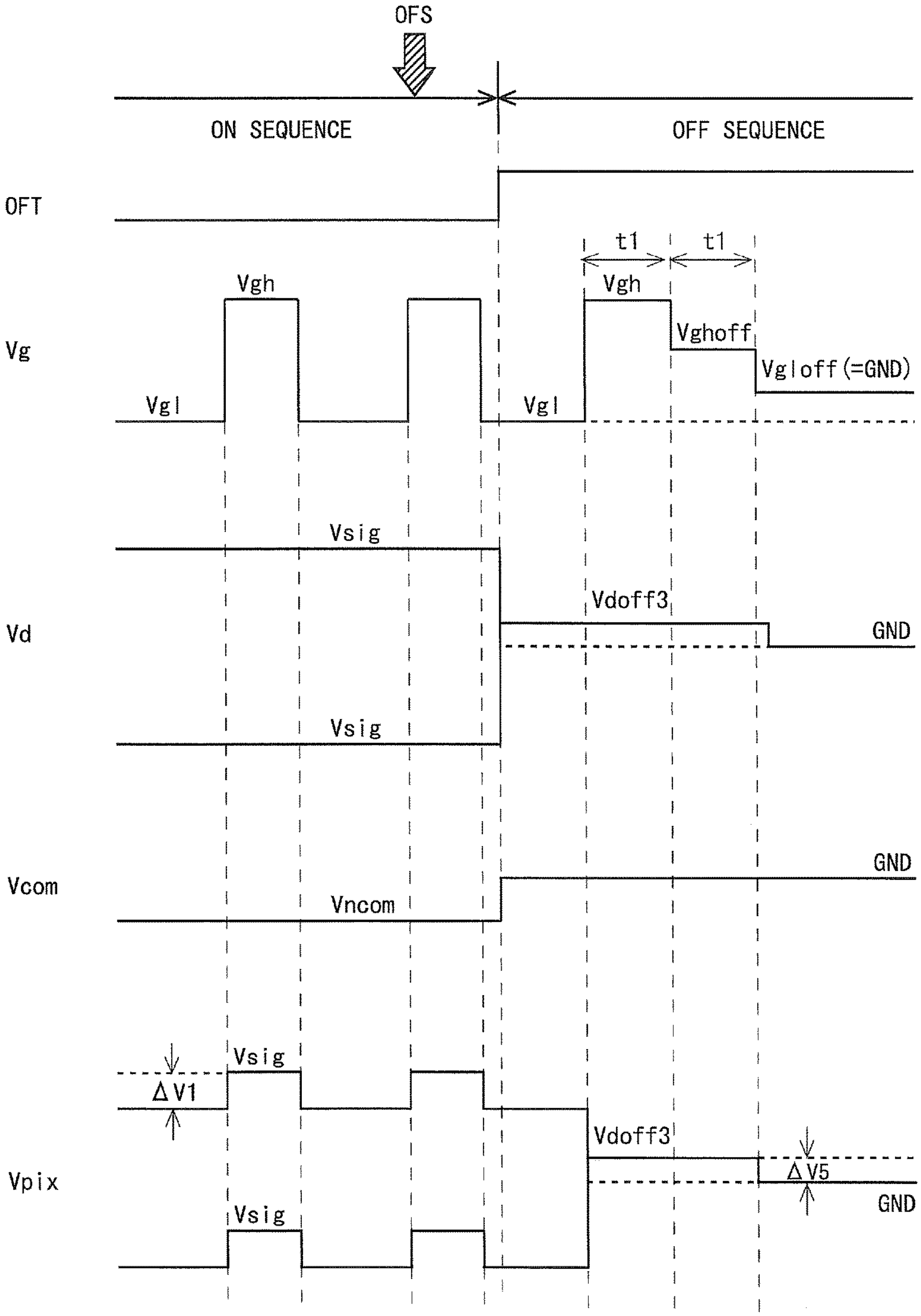
FIG. 7 is a timing chart showing a driving method of a liquid crystal display device according to a third embodiment of the present invention.

FIG. 7 is a timing chart showing a driving method of each of the pixel formation portions 11 included in the liquid crystal display device according to this embodiment. The timing chart shown in FIG. 7 shows a case where the liquid crystal display device shifts to the off-sequence mode in such a manner that the power supply is turned off when the liquid crystal display device operates in the on-sequence mode. Operations of the liquid crystal display device in the on-sequence mode are similar to those in the case of the on-sequence mode, which are described in the first embodiment, and accordingly, a description thereof is omitted.

When the liquid crystal display device operates in the on-sequence mode, if the power supply thereof is turned off, then an off-sequence mode shifting signal OFT rises when the scanning signal Vg falls from the high level to the low level for the first time after the off signal OFS is inputted to the off-sequence control circuit 60, and the liquid crystal display device shifts to the off-sequence mode.

By the fact that the liquid crystal display device shifts to the off-sequence mode, the signal line drive circuit 40 reads out the data signal Vd with the potential Vdoff3 (the data signal at the time of the off sequence), in place of the data signal Vd with the potential Vsig, the data signal Vd being obtained in advance based on the following Expression (9), and being stored in the memory 65 of the off-sequence control circuit 60, and then the signal line drive circuit 40 supplies the read data signal Vd to the signal line SL.

$$Vdoff3 = Cgd \cdot (Vghoff - Vgloff)/Ct \quad (9)$$

Note that, in the above-described Expression (9), the potential corresponding to the intermediate level of the scanning signal Vg at the time of the off sequence is defined to be the Vghoff, and the potential corresponding to the low level thereof is defined to be the Vgloff. Specifically, the potential Vgloff is the ground potential GND. Moreover, the common electrode drive circuit 50 gives the ground potential GND as the common voltage Vcom in place of the negative potential Vncom.

Next, during a period t1 that is the same period as in the case of the first embodiment, the scanning line drive circuit 30 applies the high-level scanning signal Vg to the scanning line GL. In this way, the TFT 12 turns to the on state, the data signal Vd with the potential Vdoff3, which is supplied to the signal line SL, is written into the pixel formation portion 11, and the potential of the pixel signal Vpix also becomes the Vdoff3.

After the elapse of the period t1, the level of the scanning signal Vg applied to the scanning line GL falls from the high level to the intermediate level, and the intermediate-level scanning signal Vg is applied to the scanning line GL during the period t1 one more time. In this way, the TFT 12 continues the on state thereof, and the potential of the pixel signal Vpix also maintains the Vdoff 3 by the data signal Vd of the potential Vdoff3 which is supplied to the signal line SL.

Moreover, after the elapse of the period t1, the level of the scanning signal Vg applied to the scanning line GL falls from the intermediate level to the low level. At this time, in a similar way to the case of the first embodiment, the potential Vgloff corresponding to the low level is set at the ground potential GND. As described above, if the scanning signal Vg falls from the intermediate level to the low level, then owing to the coupling effect of the parasitic capacitance Cgd, the potential Vdoff3 of the pixel signal Vpix is lowered by a shift amount ΔV5 shown in the following Expression (10).

$$\Delta V5 = Cgd \cdot (Vgh\text{off} - Vgl\text{off})/Ct \qquad (10)$$

In this case, the shift amount ΔV5 from the potential Vdoff3 of the pixel signal Vpix when the TFT 12 is turned to the off state is equal to the Vdoff3 of the pixel signal Vpix written into the pixel formation portion 11 through the TFT at such a shifting time to the off sequence, the Vdoff3 being represented by the above-described Expression (9). As a result, when the TFT 12 is turned to the off state, if the shift amount ΔV5 owing to the coupling effect of the parasitic capacitance Cgd is taken into consideration, then the potential Vpixoff of the pixel signal Vpix becomes the ground potential GND in accordance with the following Expression (11).

$$V\text{pixoff} = Vd\text{off3}\Delta V5 = 0 \qquad (11)$$

In this way, together with the common voltage Vcom of the common electrode 17, the potential Vdoff3 of the pixel signal Vpix, which is the potential of the pixel electrode 16 of the liquid crystal capacitance 15, also becomes the ground potential GND, and accordingly, the direct current voltage applied to the liquid crystal layer arranged therebetween becomes 0V.

<4.3 Effects>

In accordance with this embodiment, the potential of the scanning signal Vg is reduced step by step, and accordingly, at the time of shifting to the off-sequence mode, the data signal Vd with the potential Vdoff3 which is applied to the signal line SL can be written into the pixel formation portion 11 more surely. Other effects are similar to those in the case of the second embodiment, and accordingly, a description thereof is omitted.

<4.4 Modification Example>

In this embodiment, between the high-level scanning signal Vg and the low-level scanning signal Vg, the scanning signal Vg with the level in which the potential is the Vghoff is applied as the intermediate-level scanning signal Vg to the scanning line GL. However, the number of the intermediate-level scanning signal Vg is not limited to one, and may be plural. In a case where the number of the intermediate-level scanning signal Vg is plural, then the scanning signals Vg are such signals in which a level is reduced from the high level toward the low level step by step, and are applied to the scanning line GL in a level order from the high-level scanning signal Vg to the low-level scanning signal Vg. At this time, the potential Vdoff3 of the data signal Vd applied to the signal line SL is obtained by using a potential corresponding to the intermediate level, in which a potential is most approximate to the Vgloff, as the Vghoff of the above-described Expression (9). As described above, the plurality of intermediate-level scanning signals Vg are reduced step by step in a level order, whereby the data potential Vd with the potential Vdoff3 can be written into the pixel formation portion 11 more surely.

Moreover, in this embodiment, periods while the high-level scanning signal Vg and the intermediate-level scanning signal Vg are applied to the scanning line GL are set at the periods t1 in a similar way to the case of the first embodiment. However, each of the periods is not limited to the time t1, and may be set at a period longer than the period t1, or a period shorter than the period t1. In particular, in a case where the level of the scanning signal Vg is set lower than the high level at the time of the on sequence, the on current of the TFT 12 becomes small, and accordingly, it is preferable to further lengthen the period. Moreover, in this embodiment, the period of applying the high-level scanning signal Vg and the period of applying the intermediate-level scanning signal Vg are set the same; however, may be set at different periods in response to the level.

5. Others>

A reason why the potential of the data signal Vd is individually set at the Vdoff1 to Vdoff3 for a while even if the scanning signal Vg falls from the high level to the low level at the time of the off sequence in the above-described respective embodiments is in order to prevent the potentials Vdoff1 to Vdoff3 of the data signal Vd from being lowered by blunting of a waveform of the scanning signal Vg, which is caused by an RC load, when the data signal Vd is written into the pixel formation portion 11.

Moreover, a reason why the potential of the data signal Vd is set at such a predetermined value in advance before applying the high-level scanning signal Vg to the scanning line GL is in order to eliminate an influence from the blunting of the waveform of the data signal Vd, which is caused by the RC load, and to set the potential of the data signal Vd at such a predetermined potential before the scanning signal Vg reaches the high level. In particular, in a case of a high-definition panel, a write time of the data signal Vd is shortened, and accordingly, when the rise of the high-level scanning signal Vg and the setting of the potential of the data signal Vd at the predetermined value are performed simultaneously, a disadvantage that the write of the data signal Vd becomes insufficient is prone to occur. However, such a disadvantage can be eliminated by setting the potential of the data signal Vd at the predetermined value in advance.

In each of the above-described respective embodiments, in a case where the off signal OFS is inputted to the off-sequence control circuit 60 when the write of the data signal Vd (image signal) with the potential Vsig is performed, it is described that the shift timing to the off sequence is when the high-level scanning signal Vg falls to the low level for the first time. However, in a case where the off signal OFS is inputted during a horizontal retrace period, the liquid crystal display device may shift to the off-sequence mode immediately before the data signal Vd with the potential Vsig is written into the pixel formation portion 11 connected to the next scanning line. Moreover, the liquid crystal display device may shift to the off-sequence mode from a frame next to the frame to which the off signal OFS is inputted, or alternatively, may shift thereto after the data signal Vd with the potential Vsig is written into a few scanning lines GL further from the scanning line GL when the off signal OFS is inputted. As described above, such a shift to the off-sequence mode is performed not immediately after the off signal OFS is inputted but after the elapse of the predetermined time.

INDUSTRIAL APPLICABILITY

The present invention is suitable for a display device such as an active matrix-type liquid crystal display device. In particular, the present invention is suitable for a display device that uses a thin film transistor which has a channel layer made of an oxide semiconductor, as a switching element of a pixel formation portion.

DESCRIPTION OF REFERENCE CHARACTERS

10: DISPLAY UNIT
11: PIXEL FORMATION PORTION
12: THIN FILM TRANSISTOR (TFT)
15: LIQUID CRYSTAL CAPACITANCE
16: PIXEL ELECTRODE
17: COMMON ELECTRODE
20: DISPLAY CONTROL CIRCUIT
30: SCANNING LINE DRIVE CIRCUIT
40: SIGNAL LINE DRIVE CIRCUIT
50: COMMON ELECTRODE DRIVE CIRCUIT
60: OFF-SEQUENCE CONTROL CIRCUIT
65: MEMORY

The invention claimed is:

1. An active matrix-type liquid crystal display device that shifts to an off-sequence mode in such a manner that a power supply of the liquid crystal display device itself is turned off when the liquid crystal display device displays an image in an on-sequence mode, the liquid crystal display device comprising:

a display including a plurality of scanning lines, a plurality of signal lines which intersect the plurality of scanning lines, and pixel formation portions arranged in a matrix so as to individually correspond to intersections of the plurality of scanning lines and the plurality of signal lines, and having thin film transistors which turn to an on state or an off state in response to a level of scanning signals applied to the scanning lines corresponding to the pixel formation portions, and pixel capacitances which hold image signals representing an image to be displayed;

a scanning line drive circuit that applies the scanning signals to the scanning lines, the scanning signals serving for selectively activating the plurality of scanning lines;

a signal line drive circuit that applies the image signals to the signal lines;

a display control circuit that individually outputs control signals necessary to generate the scanning signals and the image signals to the scanning line drive circuit and the signal line drive circuit;

a common electrode drive circuit that is provided commonly to the plurality of pixel formation portions, and applies a common voltage to a common electrode serving as one-side electrodes of the pixel capacitances; and an off-sequence control circuit that outputs a signal to the display control circuit when the power supply of the liquid crystal display device is turned off, the signal being necessary for the liquid crystal display device to shift to the off-sequence mode, wherein the off-sequence control circuit:

by the scanning line drive circuit, applies a scanning signal with a second level as a ground potential to each of the scanning lines after applying the scanning signal to each of the scanning lines a scanning signal with a first level for a predetermined period;

by the signal line drive circuit, applies to each of the signal lines a data signal with a potential corresponding to a shift amount of each of the image signals for the predetermined period, the shift amount being determined by a level difference between the first level and the second level, a parasitic capacitance formed between a gate terminal and drain terminal of the thin film transistor and a synthetic capacitance of the pixel formation portion including the parasitic capacitance by turning the level of each of the scanning signals from the first level to the second level; and controls the display control circuit to apply the ground potential to the common electrode by the common electrode drive circuit; and the first level of the scanning signal is a substantially constant level which is lower than a level necessary to turn the thin film transistor to the on state in the on-sequence mode and higher than the ground potential.

2. A liquid crystal display device that shifts to an off-sequence mode in such a manner that a power supply of the liquid crystal display device itself is turned off when the liquid crystal display device displays an image in an on-sequence mode, the liquid crystal display device comprising:

a display including a plurality of scanning lines, a plurality of signal lines which intersect the plurality of scanning lines, and pixel formation portions arranged in a matrix so as to individually correspond to intersections of the plurality of scanning lines and the plurality of signal lines, and having thin film transistors which turn to an on state or an off state in response to a level of scanning signals applied to the scanning lines corresponding to the pixel formation portions, and pixel capacitances which hold image signals representing an image to be displayed;

a scanning line drive circuit that applies the scanning signals to the scanning lines, the scanning signals serving for selectively activating the plurality of scanning lines;

a signal line drive circuit that applies the image signals to the signal lines;

a display control circuit that individually outputs control signals necessary to generate the scanning signals and the image signals to the scanning line drive circuit and the signal line drive circuit;

a common electrode drive circuit that is provided commonly to the plurality of pixel formation portions, and applies a common voltage to a common electrode serving as one-side electrodes of the pixel capacitances; and an off-sequence control circuit that outputs a signal to the display control circuit when the power supply of the liquid crystal display device is turned off, the signal being necessary for the liquid crystal display device to shift to the off-sequence mode, wherein the off-sequence control circuit:

by the scanning line drive circuit, applies a scanning signal with a second level as a ground potential to each of the scanning lines after applying the scanning signal to each of the scanning lines a scanning signal with a first level for a predetermined period;

by the signal line drive dive circuit, applies to each of the signal lines a data signal with a potential corresponding to a shift amount of each of the image signals for the predetermined period, the shift amount being determined by a level difference between the first level and the second level, a parasitic capacitance formed between a gate terminal and drain terminal of the thin film transistor and a synthetic capacitance of the pixel formation portion including the parasitic capacitance by turning the level of each of the scanning signals from the first level to the second level; and controls the display control circuit to apply the ground potential to the common electrode by the common electrode drive circuit; and the first level of the scanning signal is a plurality of substantially constant levels set in a level order between a level necessary to turn the thin film transistor to the on state in the on-sequence mode and the ground potential, and the data signal at a time of an off sequence is a signal with a level determined by a level difference between a level most approximate to the ground potential among the plurality of levels and the ground potential, the parasitic capacitance formed between the gate terminal and drain terminal of the thin film transistor and the synthetic capacitance of the pixel formation portion including the parasitic capacitance.

3. The liquid crystal display device according to claim 1, wherein the predetermined period of applying the scanning signal with the first level is a longer period as an on current of the thin film transistor is smaller when the scanning signal with the first level is applied to the gate terminal of the thin film transistor.

4. The liquid crystal display device according to claim 1, wherein the off-sequence control circuit includes a memory that stores a signal necessary for the liquid crystal display device to shift to the off-sequence mode, reads out the signal necessary for the liquid crystal display device to shift to the off-sequence mode from the memory when the liquid crystal display device shifts to the off-sequence mode, and outputs the read signal to the display control circuit.

5. The liquid crystal display device according to claim 1, wherein a channel layer of the thin film transistor is formed of an oxide semiconductor.

6. The liquid crystal display device according to claim 5, wherein the oxide semiconductor contains indium, gallium, zinc, and oxygen.

7. A driving method of an active matrix-type liquid crystal display device that shifts to an off-sequence mode in such a manner that a power supply of the liquid crystal display device is turned off when the liquid crystal display device displays an image in an on-sequence mode, in which the liquid crystal display device includes:

a display including a plurality of scanning lines, a plurality of signal lines which intersect the plurality of scanning lines, and pixel formation portions arranged in a matrix so as to individually correspond to intersections of the plurality of scanning lines and the plurality of signal lines, and having thin film transistors which turn to an on state or an off state in response to a level of scanning signals applied to the scanning lines corresponding to the pixel formation portions, and pixel capacitances which hold image signals representing an image to be displayed;

a scanning line drive circuit that applies the scanning signals to the scanning lines, the scanning signals serving for selectively activating the plurality of scanning lines;

a signal line drive circuit that applies the image signals to the signal lines;

a display control circuit that individually outputs control signals necessary to generate the scanning signals and the image signals to the scanning line drive circuit and the signal line drive circuit;

a common electrode drive circuit that is provided commonly to the plurality of pixel formation portions, and applies a common voltage to a common electrode serving as one-side electrodes of the pixel capacitances; and an off-sequence control circuit that outputs a signal to the display control circuit when the power supply of the liquid crystal display device is turned off, the signal being necessary for the liquid crystal display device to shift to the off-sequence mode, the driving method comprising:

a step of, by the scanning line drive circuit, applying a scanning signal with a second level as a ground potential to each of the scanning lines after applying the scanning signal to each of the scanning lines a scanning signal with a first level for a predetermined period;

a step of, by the signal line drive circuit, applying a data signal with a potential corresponding to a shift amount of each of the image signals to each of the signal lines for the predetermined period, the shift amount being determined by a level difference between the first level and the second level, a parasitic capacitance formed between a gate terminal and drain terminal of the thin film transistor and a synthetic capacitance of the pixel formation portion including the parasitic capacitance by turning the level of each of the scanning signals from the first level to the second level; and a step of applying the ground potential to the common electrode by the common electrode drive circuit; and the first level of the scanning signal is a substantially constant level which is lower than a level necessary to turn the thin film transistor to the on state in the on-sequence mode and higher than the ground potential.

8. The liquid crystal display device according to claim 2, wherein the predetermined period of applying the scanning signal with the first level is a longer period as an on current of the thin film transistor is smaller when the scanning signal with the first level is applied to the gate terminal of the thin film transistor.

9. The liquid crystal display device according to claim 2, wherein the off-sequence control circuit includes a memory that stores a signal necessary for the liquid crystal display device to shift to the off-sequence mode, reads out the signal necessary for the liquid crystal display device to shift to the off-sequence mode from the memory when the liquid crystal display device shifts to the off-sequence mode, and outputs the read signal to the display control circuit.

10. The liquid crystal display device according to claim 2, wherein a channel layer of the thin film transistor is formed of an oxide semiconductor.

11. The liquid crystal display device according to claim 10, wherein the oxide semiconductor contains indium, gallium, zinc, and oxygen.

* * * * *